United States Patent
Scheungraber et al.

(10) Patent No.: US 9,003,873 B2
(45) Date of Patent: Apr. 14, 2015

(54) FASTENING SYSTEM FOR ATTACHING RETAINERS TO ELASTOMER COMPONENTS

(75) Inventors: Patric Scheungraber, Pliening (DE); Claudia Niemann, Munich (DE)

(73) Assignee: Rema Tip Top AG, Poing (DE)

( * ) Notice: Subject to any disclaimer, the term of this patent is extended or adjusted under 35 U.S.C. 154(b) by 276 days.

(21) Appl. No.: 13/502,613

(22) PCT Filed: Oct. 8, 2010

(86) PCT No.: PCT/EP2010/006172
§ 371 (c)(1),
(2), (4) Date: Jun. 7, 2012

(87) PCT Pub. No.: WO2011/047791
PCT Pub. Date: Apr. 28, 2011

(65) Prior Publication Data
US 2012/0248274 A1    Oct. 4, 2012

(30) Foreign Application Priority Data
Oct. 21, 2009    (DE) .......................... 10 2009 050 268

(51) Int. Cl.
*B60C 23/04*    (2006.01)
*B60C 25/05*    (2006.01)
*B29D 30/00*    (2006.01)

(52) U.S. Cl.
CPC ......... *B60C 23/0493* (2013.01); *B60C 25/0503* (2013.01); *B29D 2030/0072* (2013.01)

(58) Field of Classification Search
CPC . G01M 17/022; G01M 17/013; G01M 17/02; G01M 17/021; B60C 25/00–25/12
USPC .................................................. 73/146–146.8
See application file for complete search history.

(56) References Cited

U.S. PATENT DOCUMENTS

| 6,388,567 B1 | 5/2002 | Bohm et al. |
| 6,524,415 B1 * | 2/2003 | Youngman et al. ........... 156/123 |
| 6,688,353 B1 * | 2/2004 | Koch ......................... 152/152.1 |

(Continued)

FOREIGN PATENT DOCUMENTS

| EP | 1 048 493 A2 | 11/2000 |
| EP | 1 070 580 A2 | 1/2001 |

(Continued)

OTHER PUBLICATIONS

Feb. 25, 2014 Office Action issued in Japanese Patent Application No. JPA2012-534568.

(Continued)

*Primary Examiner* — Andre Allen
(74) *Attorney, Agent, or Firm* — Oliff PLC

(57) ABSTRACT

A retainer for accommodating an electronic component, in particular a sensor, including a main body or a main body element, which comes in contact with the electronic component, and is composed of a main body material. The retainer further includes a transition layer, which is connected to the main body and a thermoplastic connecting layer or a first connecting element, which is connected to the transition layer. The thermoplastic connecting layer is designed such that the thermoplastic connecting layer can be brought into a reversible mechanical/physical connection to a contact element or a second connecting element by a preceding partial melting process.

28 Claims, 2 Drawing Sheets

(56) References Cited

U.S. PATENT DOCUMENTS

Figure 3:
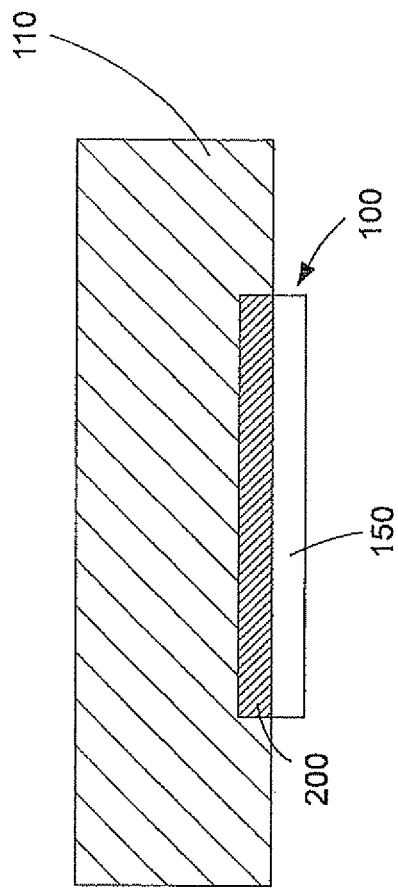

| | | | |
|---|---|---|---|
| 8,522,610 B2* | 9/2013 | Huang | 73/146 |
| 2002/0093421 A1 | 7/2002 | Bohm et al. | |
| 2003/0089451 A1* | 5/2003 | Koch | 156/245 |
| 2004/0034454 A1* | 2/2004 | Ito et al. | 701/1 |
| 2006/0289100 A1 | 12/2006 | Fowler-Hawkins | |

FOREIGN PATENT DOCUMENTS

| | | |
|---|---|---|
| EP | 1 707 406 A1 | 10/2006 |
| JP | A-2001-021456 | 1/2001 |
| JP | A-2003-529485 | 10/2003 |
| JP | A-2008-543675 | 12/2008 |
| WO | WO 01/74609 A | 10/2001 |
| WO | WO 03/095243 A1 | 11/2003 |

OTHER PUBLICATIONS

3M: "Scotch-Weld™ Schmelzklebstoffe," May 2006, XP002617726, 3M, <http://bossert-hamburg.de/3M_JetMelt_ScotchWeld_052006.pdf>.

Ruderer Klebetechnik GmbH Technicoll: "Thermoplastische Schmelzklebestoffe," XP002617727, Ruderer Klebetechnik GmbH, <http://www.technicoll.eu/de/catalog/category/thermoplastische-schmelzklebstoffe/12/>.

3M Deutschalnd GmbH, Neuss: "VHB™ Hochleistungs-verbindungssystme 4905, 4910, 4915, 4918—Produktinformation Nov. 2004," Nov. 30, 2004, <http://www.glsgmbh.de/pdf/herstellerprospekte/3m/klebebaender 4905f-4918f.pdf>.

Feb. 10, 2011 International Search Report issued in International Patent Application No. PCT/EP2010/006172 (with translation).

* cited by examiner

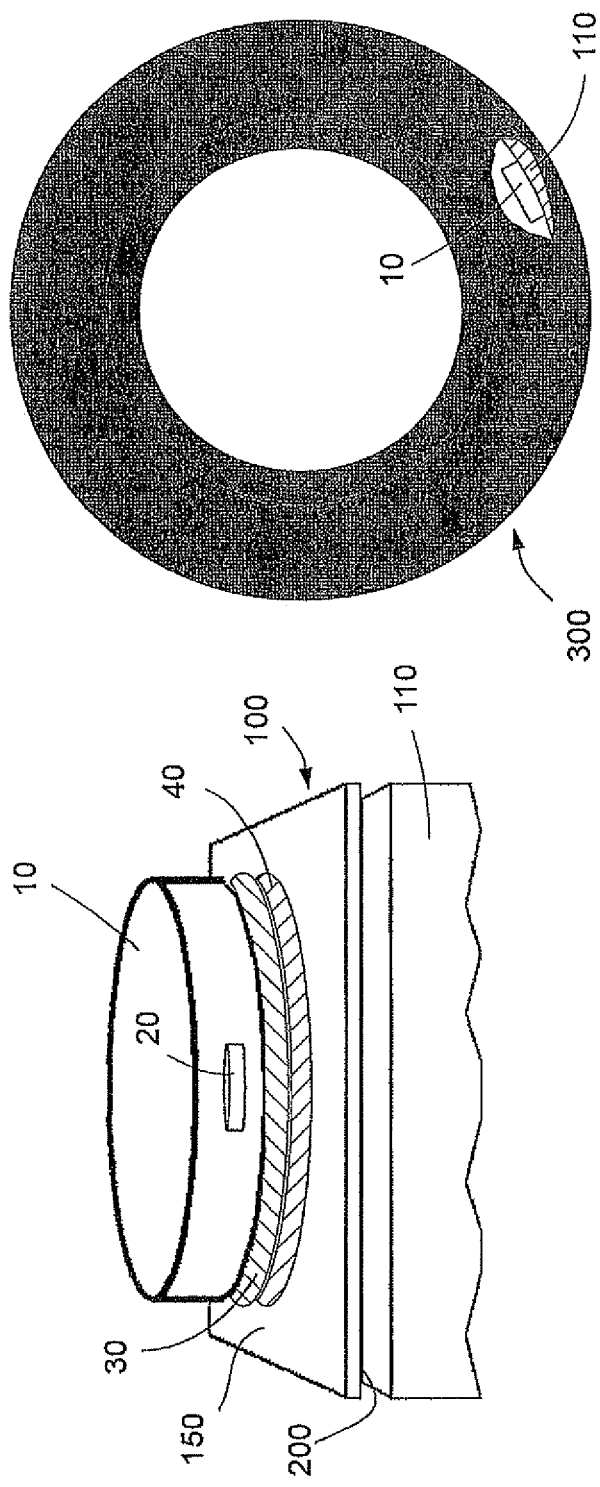

FASTENING SYSTEM FOR ATTACHING RETAINERS TO ELASTOMER COMPONENTS

The present invention relates to a fastening system for attaching retainers to elastomer components, for example for connecting sensors and sensor retainers, respectively, to the inner-liner of a vehicle tire. The fastening system according to the invention allows a fast, permanent connection again reversibly detachable on demand to an elastomer component. Furthermore, the fastening system according to the invention is suitable for attaching both stiff and non-stiff components to an elastomer component.

As part of the integration of electronic components or systems in various elastomer components such as in a vehicle tire, on a conveyer belt etc. there arises the requirement to securely connect components with very different material properties to each other, respectively, in the new manufacture or within the scope of retrofit.

In addition, the type of stress of the elastomer component, in which a permanent connection of the components to be connected has to be ensured requires particular consideration. Thus, elastomer components are mostly subjected to bending (alternating) stress in operation, which results in a mostly locally bounded elastic deformation with simultaneous heat development. Therein, the connection of the elastomer component to the retainer is not allowed to detach under stress or due to the heating.

In particular in the automobile industry, so-called air pressure control systems for the individual vehicle tires are employed to increasing extent. With the active systems, the vehicle tire is equipped with a sensor in the interior, which senses the air pressure and therefore has to be in force-fit connection to the tire. The electronic components of the sensor are usually molded in plastic and are connected to the vehicle tire via a retainer of an elastomer material. Therein, the installation of the sensor is effected in a work step succeeding the actual tire production.

A retainer for attaching an electronic component to a rubber item is known from EP 1 707 406 B1. The connection between the retainer and the rubber item is herein effected via a vulcanization operation. Here, the relatively time-consuming and labor-intensive attachment operation and additionally also the requirement of use of a vulcanizing agent are disadvantageous.

In order to avoid the use of a vulcanizing agent and to allow secure attachment of the retainer, it would be conceivable to apply elements projecting or designed as a recess to the inner side of the vehicle tire during the tire manufacture or to subsequently attach corresponding fastening elements to the inner side of the vehicle tire. However, in case of the fastening elements attached in the new tire production, the relatively expensive geometry variations on the inner side of the vehicle tire disturbing in the manufacturing process and thus the considerable overhead arising thereby up to a possible quality restriction of thus produced vehicle tires are disadvantageous in this process. By the local mass difference, thereby, a possibly not insignificant imbalance of the vehicle tire can also be generated.

Moreover, these vehicle tires unnecessarily have the fastening elements in case of non-use of the fastening elements, which optionally act disturbing in further use and cannot be again attached after removal, respectively.

The requirement of pre-treatment of the vehicle tire at the location provided for connection on the one hand, the expenditure of time for the adhesive application and the required drying time after gluing on the other hand are disadvantageous in the above described methods. Furthermore, the employment of solvent containing preparations is required, the employment of which should be increasingly avoided—as far as possible.

It is an object of the present invention to provide a retainer for attaching to an elastomer component, an elastomer component allowing the attachment of the retainer as well as a method for attaching the retainer to the elastomer component, wherein the assembly effort decreases, a secure and permanent connection is present and a reversible non-destructive detachment of the connection is possible.

According to the invention, this object is solved by the features of the independent claims as well as by a method according to claim 24. Advantageous developments and preferred embodiments of the invention are specified in the dependent claims.

In the following, the terms "first connecting element" and "thermoplastic connecting layer" are equivalently used in the description. The same applies to the use of the terms "second connecting element" and "contact element" as well as to the terms "main body element" and "main body".

A retainer for receiving an electronic component, in particular of a sensor, is provided, which has a main body or a main body element coming into contact with the electronic component and composed of a main body material. Furthermore, the main body can include a transition layer connected to the main body. Furthermore, the retainer includes a thermoplastic connecting layer or a first connecting element, wherein it can be connected to the transition layer. The thermoplastic connecting layer can be formed such that it can be reversibly mechanically connected to a contact element or a second connecting element by a preceding partial melting operation. Furthermore, at least the first or the second connecting element can be a thermoplastic connecting element, which can be reversibly connected to the respectively other connecting element by a preceding partial melting process.

With the present fastening system, a system is formed, which includes the retainer as well as the elastomer component, which are connected to each other by means of a reversible connection.

The first connecting element can be formed as a layer of a thermoplastic material, while the second connecting element can also be formed as a layer of a thermoplastic material. Furthermore, the first connecting element can be formed of a non-thermoplastic material, for example as a fabric or a fabric-like structure, and the second connecting element can be formed as a layer of a thermoplastic material. Furthermore, the first connecting element can be formed of a thermoplastic material and the second connecting element can be formed of a non-thermoplastic material, for example as a fabric or a fabric-like structure.

The present fastening system is characterized in that the two connecting elements can either have identical or similar material properties or else have material properties different from each other, wherein the partial melting operation for that connecting element that is the thermoplastic connecting element, is always required before assembling the two connecting elements.

In addition, the respective above mentioned configurations of the connecting elements on the retainer or on the elastomer component can be mutually exchanged within the scope of the present fastening system. Thus, the fastening system can be employed for a plurality of applications, wherein the design of the two connecting elements can each be adapted to the components to be connected or the employment constraints.

The retainer can be both a stiff element and a deformable element. In the following, by the term "stiff element", those elements are to be understood, which are not capable for example during the roll motion of a vehicle tire of following the repeated deformations of the vehicle tire occurring therein. The corresponding applies in general form to the connection of a stiff element to any elastomer component. These stiff elements can be either nearly completely non-deformable or (partially) deformable, wherein the elastic deformations of the elastomer component are many times greater. They are capable of bending under load, while they do not reproduce local variations of the surface area of the elastomer component due to the temporally varying radii of curvature of the elastomer component.

The invention is based on the principle of mechanical/physical bonding forces upon joining two areas. The transferable force is the product of available area and available bonding force. Since the mechanical/physical bonding forces are usually low, an effective area as large as possible is required to ensure a reliable connection. Since the mechanical/physical bonding forces cannot be varied to large extent, increase of the effective surface is sought. To this, the material of the thermoplastic connecting layer is heated to a predetermined temperature such that it achieves such a viscosity, at which infiltration of the contact side of the contact element with the desired penetration depth arises with simultaneous pressing of the retainer onto the contact element. The pressing of the retainer is continued with suitable pressure until the heated thermoplastic connecting layer is cooled to a predetermined temperature, at which the retainer securely remains on the joint with the elastomer component after removal of the contact pressure.

Examples of application for the fastening system can for example be vehicle tires with characterizing tags (for example for the storage of dates of manufacture) up to passive or active sensors for sensing state situations (temperature, tire filling pressure, acceleration etc). The fastening system can e.g. also be advantageously employed for attaching sensors to conveyor belts.

Within the scope of manufacture of the elastomer component, in the region of the subsequent surface (e.g. tire inner side/cover plate of material to be conveyed), a connecting surface defined in its size and thickness in the form of a planar, for example blanked out contact element is attached as part of the manufacture of the elastomer component. By corresponding connecting properties of the attached contact element and the thus ensured irreversible connection to the respective material of the elastomer component, such as tire inner-liner, the permanent, seamless connection of the contact element in particular flush terminating with the surface of the elastomer component is effected within the scope of the subsequent vulcanization. After completion of the elastomer component, the retainer to be attached thereto can be permanently and securely bound to the contact element on the surface of the elastomer component by a thermoplastic melting operation.

In addition, the fastening system has the advantage that thereby the connection of the retainer to the elastomer component is again non-destructively reversibly detachable even several times by heating the thermoplastic connecting layer.

In addition, the fastening system offers the advantage compared to a gluing or vulcanization method that before attaching the retainer, preparation of the contact surface on the elastomer component is no longer required and the joining process occurs without addition of a further medium. Besides the time saving, thereby, a positive environmental aspect results, since now emissions for example in the form of vapors detrimental to environment or health are not released.

For the contact element, preferably, a structure is used, which has a surface as large as possible within a certain area with a spatial structure as large as possible (high specific surface) on both sides. To this, fabrics or fabric-like structures are particularly suited. A simple example of a structure according to the invention is canvas consisting of natural and/or synthetic fibers. The design of the fabric with respect to its deformability is to be selected such that the material can follow the elastic deformations respectively occurring in the elastomer component. The use of a fabric in addition proves to be an inexpensive contact element available in manifold designs.

In the selection of the fabric, care has to be taken that it is sufficiently dense such that the penetration of the material of the elastomer component during the manufacturing process thereof, for example the vulcanizing process, can be controlled.

Preferably, the thermoplastic connecting layer of the retainer coming into contact with the fabric or the contact element can have a thickness between 0.3 mm and 3.0 mm.

Furthermore, in a retainer, the contact element can have such a surface that a specific shear force of at least 2.5 N/mm at 20° C. is present between the contact element and the thermoplastic connecting layer, wherein the contact element is in particular a fabric or a fabric-like material. In the following, by the specific shear force, the peel resistance according to DIN EN 28510/ISO 8510 is to be understood. The peel resistance results as the quotient of separating force and the sample width.

Furthermore, in a retainer, the contact element can have such a surface that a specific shear force of 0.5-5 N/mm in a temperature range from −60 to +150° C. is present between the thermoplastic connecting layer and the contact element.

In a preferred form of the retainer, the partial melting temperature of the thermoplastic connecting layer can be below the melting temperature of the contact material and at least above the maximum operating temperature of the retainer.

Furthermore, in a retainer, the relative ratio of the penetration depth of the partially molten thermoplastic connecting layer into the contact element to the specific shear force can be in the range of 0.5 to 7. Thus, for example, increase of the penetration depth by 10% results in increase of the specific shear force of 5 to 70%.

Furthermore, in a retainer, the relative ratio of the penetration depth of the partially molten thermoplastic first connecting element into the second thermoplastic connecting element to the specific shear force can be in the range of 0.5 to 7. Thus, for example, increase of the penetration depth by 10% results in increase of the specific shear force of 5 to 70%.

Furthermore, in a retainer, the main body can be an electronic component, which can be mechanically and/or physically fixed to the contact element in accurate position.

Furthermore, in a retainer, the main body can be a retainer, which can be mechanically and/or physically fixed to the contact element in accurate position.

Furthermore, an elastomer component is provided, which comprises a base body of a base body material and at least one contact element with each a connection side and a contact side, wherein the contact side extends away from the surface of the elastomer component. The contact element is connected to a region of the surface of the elastomer component via the connection side. The contact element is formed such that it can be reversibly connected to the thermoplastic connecting layer by a preceding partial melting operation of a thermoplastic connecting layer of a retainer.

In the following, one- or multi-component systems deformation-resistant, but elastically deformable are to be understood by an elastomer component.

Furthermore, in an elastomer component, a penetration depth of the base body material into the contact element can be in a range between 30% and 55% of the thickness of the contact element. The lower limit is influenced by the demand for an at least present specific shear force of 2.5 N/mm of the connection between the retainer and the elastomer component. The upper limit is influenced by a sufficiently large penetration depth for the thermoplastic connecting layer into the contact element upon connecting the retainer to the elastomer component. If the contact element is composed of a thermoplastic material, thus, the penetration depth can be 0% to 5%.

In an elastomer component, the contact element can contain at least one fabric ply of a fabric. In a further form of the elastomer component, a plurality of fabric plies of the same fabric can be disposed one above the other, wherein the orientation of the fabric plies relatively to each other can be identical or arbitrary.

Furthermore, in an elastomer component, the fabric can have at least one and preferably all of the following features:

The thread diameter for the threads of the fabric is in the range between 0.1 mm and 1.3 mm, the thread adjustment is in the range of 50 to 200 threads per decimeter. In a further embodiment of the elastomer component, the thread diameters for the threads of the fabric can be in the range between 0.3 mm and 1.3 mm.

Preferably, in an elastomer component, the fabric can contain threads of polyamide or polyester. The employment of the above mentioned threads allows the use of a thermoplastic connecting layer with a higher partial melting temperature compared to threads of natural fibers.

In an elastomer component, the fabric can contain natural fibers. All of the fibers of an organic material are to be understood by natural fibers, as they preferably are formed by plants or animals. Thus, the fibers can for example be produced from cotton, hemp, jute, wool or silk. Instead of a fabric, a polyamide/polyester or other thermoplastic foil can be provided for the contact element.

Furthermore, in an elastomer component, the contact element can be covered by an adhesive protective foil in the region of its contact side up to use. Thus, contamination of the contact element during the manufacturing and logistics process can effectively be prevented. Advantageously, the protective foil can be detached from the contact element with low force effort.

Preferably, the elastomer component can be a tire and the contact side of the fabric can be disposed on the inner side of the tire. With this construction, e.g. a sensor can be permanently attached to the inner-liner of the vehicle tire by means of the contact element, and on demand, for example for the retreading or the repair of the sensor, for the renewal of the sensor etc., it can be again non-destructively reversibly detached. Subsequently, a new retainer for example with a new sensor (or with a new TAG) can be attached to the contact element. A new sensor or a new TAG can also be inserted into the old retainer, wherein the old retainer is then again permanently attached to the inner-liner of the vehicle tire.

The invention expressly also extends to a tire with the retainer for an electronic component disposed thereon.

Furthermore, in an elastomer component, a retainer can be reversibly attached to the contact side of the contact element.

Furthermore, in an elastomer component, the first connecting element of the main body element can have a flat design and the contact side of the second connecting element can be curved, wherein the ratio of the thickness of the thermoplastic first connecting element to the radius of curvature of the contact side of the second connecting element can be in the range of 5-15 times the length or the diameter of the flat main body element. For determining the length of the flat main body element, it is measured in direction of curvature. Furthermore, the ratio of the thickness of the thermoplastic first connecting element to the radius of curvature of the contact side of the second connecting element can be in the range of 5-10 times the length of the flat main body element. This ratio results in a low layer thickness of the thermoplastic first connecting element, which at the same time results in a secure and permanent connection to the main body element.

In a vehicle tire, the greater curvature of which is present in circumferential direction, the derivation of the above mentioned relationship is based on the circumstance that the flat sensor retainer or the flat sensor is attached to the inner-liner with the curvature of the vehicle tire in a curved shell geometry. According to (installation) length of the sensor in circumferential direction, a circular segment with an associated arc (on the inner-liner of the vehicle tire) and a chord (corresponding to the bottom of the sensor) is formed. R denotes the radius of the vehicle tire and A denotes the length of the sensor in circumferential direction of the vehicle tire. For the height H of a thus formed chord, it applies:

$$H = R - \sqrt{(R^2 - A^2/4)}$$

According to the determination that the thickness of the thermoplastic first connecting element is to be (at least) twice as large as the chord height H, with a sensor diameter of for example 50 mm in connection with for example a scooter tire 90/90-10 (diameter 416 mm), a layer thickness of 3.1 mm, for example for a 59/80R63 OTR tire (diameter 4000 mm), a minimum layer thickness of 0.31 mm, and for example for a passenger car tire of the size 205/55R16 (diameter 632 mm) 2.00 mm result.

Approximately, the layer thickness can be calculated as follows:

$$D = 5 \ldots 15 \cdot A/R$$

or $$D \cdot R = 5 \ldots 15 \cdot A$$

With the aid of the above mentioned ratio, according to the present fastening system, not only a stable and permanent connection of the sensor or of the sensor retainer to the vehicle tire is achieved in the resting state of the vehicle, but also a dynamic decoupling of the connection of the attached component during flattening of the vehicle tire upon contact thereof with the roadway is achieved. This results in increase of the possible operating period and in a higher operating safety, wherein at the same time a higher employment temperature for the fastening system is allowed.

Furthermore, a method for attaching a retainer to an elastomer component is provided comprising the following steps of:

disposing the contact element such that it is in a region of the surface of the elastomer component after manufacture of the elastomer component in its final position, and/or manufacturing the elastomer component, wherein the material of the contact element is selected such that the penetration depth of the base body material of the elastomer component is in the range between 30% and 55% of the thickness of the contact element and the contact element is irreversibly connected to the elastomer component.

At a vulcanization pressure preset by the manufacturing process of the elastic component, the penetration depth of the base body material of the elastic component can be varied for example by corresponding adaptation of the contact element (e.g. thread density, thread diameter etc.).

Furthermore, the method can comprise the steps of:
heating the thermoplastic connecting layer of the retainer to a joining temperature, which is selected such that partial melting and/or fusing of the contact side of the contact element is prevented,
disposing the partially molten thermoplastic connecting layer of the retainer in the region of the contact side of the contact element of the elastomer component, and/or
pressing the retainer to the elastomer component, wherein the contact pressure of the partially molten thermoplastic connecting layer on the contact region of the contact element and the pressing time are selected such that the specific separating force between the retainer and the contact element is at least 2.5 N/mm at 20° C. after cooling down of the thermoplastic connecting layer.

The temperature for partially melting the thermoplastic connecting layer can be at least 120° C. The temperature for partially melting the thermoplastic connecting layer can be greater than 180° C. Therein, the melting operation by temperature impact preferably occurs in a period of time of 5 to 35 seconds.

In the method, the contact pressure for the partially molten thermoplastic connecting layer can be in the range of 0.05 MPa to 2 MPa, preferably in a range of 0.2 to 1.0 MPa. These contact pressures effect a sufficiently large penetration depth of the thermoplastic connecting layer into the contact side of the contact element for obtaining a stable connection, wherein the maximum penetration depth of the connecting layer is limited by the present penetration depth of the base body material into the contact element. Thereby, the required heat supply can be limited in detaching the retainer from the elastomer component since the amount of material to be partially molten is lower than for example with a greater penetration of the connecting layer. Accordingly, a permanent connection and at the same time a good detachability of the retainer are ensured.

In the method, the energy supply for partially melting the thermoplastic connecting layer of the retainer can be effected by means of UHF, ultrasound or thermally.

In the method, the penetration depth of the partially molten thermoplastic connecting layer into the contact side of the contact element can be at least 30% of the thickness of the contact element, and it can substantially be maintained even after cooling of the thermoplastic connecting layer.

Furthermore, in the method for attaching a retainer to an elastomer component, at least one method step can be effected automatically or at least partially automatically using a corresponding handling device. Furthermore, within the context of new manufacture of vehicle tires, the fastening system according to the invention offers the possibility of providing a contact element for the retainer simply and inexpensively to be attached, which is formed neither raised or relevantly inwardly projecting nor disturbing on the inner side of the vehicle tire. In addition, this contact element can be disposed undefined or predefined at very different locations on the inner-liner of the vehicle tire arranged one time or multiple times, and for example be optically identifiable by a corresponding label e.g. by means of unique coloring and thus fully automatically be detected by corresponding sensory detecting devices (e.g. optical image recognition). By this automatic detection, a fully automatic subsequent process and thus attachment of the retainer according to the invention in the vehicle tire or to other elastomer components is possible.

Advantageous developments and further details of the present invention are described below based on different embodiments with reference to schematic figures.

Figure 4:
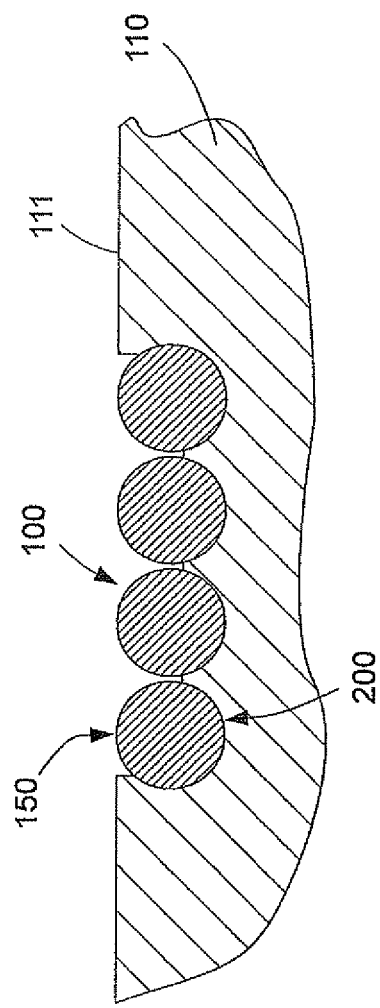

FIG. 1 shows a perspective view of a retainer and an elastomer component according to the present invention, FIG. 2 shows a lateral view of a tire with a retainer according to the invention, FIG. 3 shows a schematic sectional view of an elastomer component, and FIG. 4 shows schematically a region of an elastomer component with a fabric in a sectional view.

In the following description of figures, according to the above explanations, the terms "first connecting element" and "thermoplastic connecting layer" are equivalently used in the description. The same applies to the use of the terms "second connecting element" and "contact element".

With reference to FIG. 1, a retainer for a sensor 20 connected to an elastomer component by means of a contact element 100, here a fabric, is schematically shown in an exploded illustration. In the general form, the retainer serves for receiving one or more electronic components, here a sensor 20, wherein the retainer can also receive any other components, which do not have any electronic constituents.

The retainer has a main body 10 composed of a main body material. The main body material can for example be a plastic or an elastomer material. The sensor 20 serves for sensing measured values as they are for example sensed in an automobile during the operating time.

Depending on the purpose of employment, the sensor 20 can be an active or a passive sensor. The sensor 20 is in contact with the main body 10 of the retainer, wherein the sensor 20 is preferably connected to the main body such that the sensor 20 substantially maintains its installation position. For example, this can be realized by molding the sensor 20 in the main body 10 of the retainer or by means of gluing. Form-fit and/or force-fit connections between the sensor 20 and the main body 10 are also possible.

The retainer has a transition layer 30 at an end of the main body 10, which is connected to the main body 10. The transition layer 30 serves for connecting the retainer to a thermoplastic connecting layer 40, which constitutes the interface for the connection of the retainer to an elastomer component. However, in certain applications, it is also possible that the transition layer 30 is omitted or that the main body material is identical to the material of the transition layer 30.

Furthermore, the retainer has a thermoplastic connecting layer 40 connected to the transition layer 30 (if present). Therein, the thermoplastic connecting layer 40 can completely or partially cover the transition layer 30. The thickness of the thermoplastic connecting layer 40 is in a range of 0.3 mm to 3.0 mm depending on the deformation occurring in the retainer, wherein additionally the thickness of the contact element 100 is to be considered in determining the thickness of the thermoplastic connecting layer 40.

The contact element 100 or the fabric in turn is connected to both the thermoplastic connecting layer 40 and to a base body 110 of an elastomer component. The connection of the contact element 100 to the thermoplastic connecting layer 40 is realized by means of infiltration of the thermoplastic connecting layer 40 into the contact element 100, wherein a partial melting operation of the thermoplastic connecting layer 40 precedes for this.

The contact element 100 or the fabric each has a connection side 200 and a contact side 150, wherein the contact side 150 extends away from the surface of the elastomer component. The contact element 100 or the fabric is connected to the elastomer component via the connection side 200.

For forming a separating force of the connection of thermoplastic connecting layer 40 to the fabric as large as possible, the fabric should have the following properties:

The type of the fabric can be arbitrarily selected, while the thread diameter of the threads of the fabric is in the range between 0.1 mm and 1.3 mm, wherein this value is to be selected depending on the purpose of employment and the stresses during the operation. Thus, for example, for the connection of a sensor retainer to the inner-liner of a vehicle tire, a thread diameter of 0.3 mm has been determined as particularly advantageous. With regard to the thread adjustment, a selection from a range of 50 to 200 threads per decimeter is particularly advantageous for achieving a specific shear force as large as possible.

Due to the above mentioned infiltration of the thermoplastic connecting layer 40 into the fabric for connecting the retainer to the elastomer component, after cooling of the thermoplastic connecting layer 40, a certain penetration depth of the thermoplastic connecting layer 40 into the fabric or the contact element 100 results. Therein, the penetration depth of the thermoplastic connecting layer 40 should be at least 30% of the thickness of the fabric or of the contact element 100. Thus, for example, specific shear forces between the thermoplastic connecting layer 40 and the fabric of more than 2.5 N/mm can be achieved.

The fabric or the contact element 100 is connected to the elastic component, which has a base body 110 of a base body material. The fabric is connected to the base body 110 also by means of infiltration of the base body material into the fabric, whereby an irreversible mechanical connection between the fabric and the base body 110 arises. Therein, the penetration depth of the base body material into the fabric in the region of the connection side 200 is preferably in a range of 30%-55% of the thickness of the fabric.

The penetration depth of the base body material can be specifically adjusted by the selection of the base body material, the type and the quality of the fabric or of the contact material 100 and, in case of a vehicle tire as an elastomer component, by means of the selection of the vulcanization pressure.

FIG. 2 shows a vehicle tire 300, to which a main body 10 according to the invention is attached in the region of the base body 110 of the vehicle tire 300. The main body 10 can be a sensor retainer and the base body 110 can be an inner-liner. The vehicle tire 300 has a reversible mechanical connection according to the invention to the thermoplastic connecting layer (not shown) of the main body 10 using a fabric (not shown).

FIG. 3 shows in a schematic illustration a reversible mechanical/physical connection according to the invention of the base body 110 (e.g. the inner-liner of a tire) to the contact element 100, which is formed for connection to the retainer according to the invention. The contact element 100 has a connection region 200, which is infiltrated by the base body material up to about half of the thickness of the contact element 100 in this example. The penetration depth of the base body material is substantially constant along the longitudinal direction of the contact element 100.

On the opposing side of the connection region 200, there is the contact region 150 of the contact element 100, which is infiltrated neither with the base body material nor with the thermoplastic connecting layer (not shown) of the retainer (not shown) before the connection of the elastomer component to the retainer according to the invention. Up to the use of the elastomer component, the contact region 150 is covered by a protective foil (not shown).

FIG. 4 shows in a schematic lateral sectional view an elastomer component, the base body 110 of which is provided with a fabric. The fabric has a plurality of threads across the width thereof.

The contact region 150 does not contain any base body material. The contact region 150 of the contact element 100 or of the fabric is disposed substantially flush (on the same level) with the surface 111 of the base body 110. Furthermore, the fabric can also be connected to the base body 110 such that the contact region 150 of the fabric slightly protrudes beyond the surface 111 of the base body 110, wherein the penetration depth of the base body material into the connection region can be adjusted in a range of 30% to 55% of the thickness of the fabric during the manufacturing process of the elastomer component.

The shown embodiments are to be interpreted purely illustrative and not restrictive. Numerous alterations can be made to them without departing from the scope of protection of the claims.

The invention claimed is:

1. A main body element including
a first connecting element formed such that it can be reversibly connected to a second connecting element, wherein at least the first or the second connecting element is a thermoplastic connecting element and can be reversibly connected to the respectively other connecting element by a preceding partial melting process.

2. The main body element according to claim 1, wherein the thickness of the first connecting element is between 0.3 mm and 3.0 mm.

3. The main body element according to claim 1, wherein the second connecting element has such a surface that a specific shear force of at least 2.5 N/mm at 20° C. is present between the first connecting element and the second connecting element.

4. The main body element according to claim 1, wherein the second connecting element has such a surface that a specific shear force of 0.5-5 N/mm in a temperature range from 60 to +150° C. is present between the first connecting element and the second connecting element.

5. The main body element according to claim 1, wherein the first connecting element is a thermoplastic connecting element and can be reversibly connected to the second connecting element by a preceding partial melting operation.

6. The main body element according to claim 1, wherein the reversible connection is a mechanical and/or physical connection.

7. The main body element according to claim 5, wherein the partial melting temperature of the first connecting element is
equal to or below the melting temperature of the second connecting element, and
at least above the maximum operating temperature of the main body element.

8. The main body element according to claim 5, wherein the relative ratio of the penetration depth of the partially molten first connecting element into the second connecting element to the specific shear force is in the range of 0.5 to 7.

9. The main body element according to claim 1, wherein the relative ratio of the partial melting depth of the partially molten thermoplastic first connecting element into the second connecting element which is formed as a thermoplastic connecting element, to the specific shear force is in the range of 0.5 to 7.

10. The main body element according to claim 1, wherein the main body element is an electronic component, which can be mechanically and/or physically fixed to the second connecting element in accurate position.

11. The main body element according to claim 1, wherein the main body element is a retainer for receiving an electronic component which can be mechanically and/or physically fixed to the second connecting element in accurate position.

12. An elastomer component comprising:
a base body of a base body material, and
at least a second connecting element with each a connection side and a contact side, wherein the connection side faces the base body and the contact side is provided on the opposing side of the second connecting element, wherein
the second connecting element is connected to the elastomer component via the connection side and
the second connecting element is formed such that it can be reversibly connected to a first connecting element, wherein at least the first or the second connecting element is a thermoplastic connecting element and can be reversibly connected to the respectively other connecting element by a preceding partial melting operation.

13. The elastomer component according to claim 12, wherein the second connecting element is formed such that it can be reversibly connected by a preceding partial melting operation of the first connecting element formed as a thermoplastic connecting element.

14. The elastomer component according to claim 12, wherein the second connecting element terminates flush in area with the surface of the elastomer component.

15. The elastomer component according to claim 12, wherein a penetration depth of the base body material into the second connecting element is in a range between 30% and 55% of the thickness of the second connecting element.

16. The elastomer component according to claim 12, wherein the second connecting element contains at least one fabric ply of a fabric and/or a foil.

17. The elastomer component according to claim 16, wherein the fabric has at least one of the following features:
the thread diameter for the threads of the fabric is in the range between 0.1 mm and 1.3 mm,
the thread adjustment is in the range of 50 to 200 threads per decimeter.

18. The elastomer component according to claim 16, wherein the fabric contains threads of polyamide and/or polyester.

19. The elastomer component according to claim 16, wherein the fabric contains natural fibers.

20. The elastomer component according to claim 12, wherein the second connecting element is covered by an adhesive protective cover in the region of its contact side up to the use.

21. The elastomer component according to claim 12, wherein it is a tire and the contact side of the fabric is disposed on the inside of the tire.

22. The elastomer component according to claim 12, wherein a main body element includes the first connecting element and the first connecting element is reversibly attached to the contact side of the second connecting element.

23. The elastomer component according to claim 22, wherein the first connecting element of the main body element has a planar design and the contact side of the second connecting element is curved, wherein the ratio of the thickness of the thermoplastic first connecting element to the radius of curvature of the contact side of the second connecting element is in the range of 5-15 times the length of the planar main body element.

24. A method for attaching a main body element to an elastomer component according to claim 12, the main body component including the first connecting element, the method comprising the following steps of:
disposing the second connecting element such that it is in a region of the surface of the elastomer component after manufacture of the elastomer component in its final position,
manufacturing the elastomer component, wherein the material of the second connecting element is selected such that the penetration depth of the base body material of the elastomer component is in the range between 30% and 55% of the thickness of the second connecting element and the second connecting element is irreversibly connected to the elastomer component.

25. The method according to claim 24, further comprising:
heating the thermoplastic first connecting element of the main body element to a joining temperature selected such that complete partial melting and/or fusing of the second connecting element is completely or partially prevented,
disposing the partially molten thermoplastic first connecting element in the region of the contact side of the second connecting element,
pressing the main body element to the elastomer component, wherein the contact pressure of the partially molten thermoplastic first connecting element onto the contact region of the second connecting element and the pressing time are selected such that the separating resistance between the main body element and the second connecting element is at least 2.5 N/mm at 20° C. after the cooling of the thermoplastic second connecting element.

26. The method according to claim 24, wherein the specific contact pressure for the partially molten thermoplastic first connecting element is in the range of 0.05 MPa to 2 MPa.

27. The method according to claim 24, wherein the energy supply for partially melting the thermoplastic first connecting element is effected by means of UHF, ultrasound or thermally.

28. The method according to claim 24, wherein the penetration depth of the partially molten thermoplastic first connecting element into the contact side of the second connecting element is at least 30% of the thickness of the second connecting element and it is substantially maintained even after cooling of the thermoplastic first connecting element.

* * * * *